United States Patent
Stinger et al.

(10) Patent No.: US 6,857,268 B2
(45) Date of Patent: Feb. 22, 2005

(54) CASCADING CLOSED LOOP CYCLE (CCLC)

(75) Inventors: Daniel Harry Stinger, Sugar Land, TX (US); Farouk Aslam Mian, Houston, TX (US)

(73) Assignee: WOW Energy, Inc., Sugar Land, TX (US)

( * ) Notice: Subject to any disclaimer, the term of this patent is extended or adjusted under 35 U.S.C. 154(b) by 0 days.

(21) Appl. No.: 10/199,257

(22) Filed: Jul. 22, 2002

(65) Prior Publication Data
US 2004/0011039 A1 Jan. 22, 2004

(51) Int. Cl.⁷ .............................................. F01K 25/08
(52) U.S. Cl. .............................. 60/651; 60/653; 60/671
(58) Field of Search .......................... 60/651, 653, 671, 60/677, 678, 679

(56) References Cited

U.S. PATENT DOCUMENTS

| | | | |
|---|---|---|---|
| 4,078,976 A | * | 3/1978 | Spears, Jr. .................... 203/10 |
| 4,104,535 A | | 8/1978 | Bronicki |
| 4,372,124 A | * | 2/1983 | Newton et al. ............... 60/648 |
| 4,677,827 A | | 7/1987 | Shenoy et al. |
| 4,711,093 A | | 12/1987 | Markbreiter et al. |
| 4,873,834 A | | 10/1989 | Cox |
| 5,038,567 A | | 8/1991 | Mortiz |
| 5,425,230 A | | 6/1995 | Shpak |
| 5,570,579 A | | 11/1996 | Larjola |
| 5,660,042 A | | 8/1997 | Bronicki et al. |
| 5,664,414 A | | 9/1997 | Bronicki et al. |
| 5,687,570 A | | 11/1997 | Bronicki et al. |
| 5,953,918 A | | 9/1999 | Kalina et al. |
| 6,052,997 A | * | 4/2000 | Rosenblatt ................... 60/653 |
| 6,195,997 B1 | | 3/2001 | Lewis et al. |

OTHER PUBLICATIONS

Ronald DiPippo, "Geothermal Power Systems," Standard Handbook of Powerplant Engineering, sec. 8.2.

L. Bronicki, "Rankine Cycle Power Unit Operating with Isotopic Heat Sources," Joint UKAEA–ENEA International Symposium (1996).

* cited by examiner

Primary Examiner—Hoang Nguyen
(74) Attorney, Agent, or Firm—Hunton & Williams

(57) ABSTRACT

A Cascading Closed Loop Cycle (CCLC) system is described for recovering power in the form of mechanical or electrical energy from any thermal energy source whose temperature is sufficiently high to vaporize a pressurized light hydrocarbon medium such as propane or propylene. A light hydrocarbon medium is vaporized in multiple indirect heat exchangers; expanded in multiple cascading expansion turbines to generate useful power; and condensed to a liquid using a cooling system. The light hydrocarbon liquid medium is then pressurized with a pump and returned to the indirect heat exchangers to repeat the vaporization, expansion, liquefaction and pressurization cycle in a closed, hermetic process.

5 Claims, 1 Drawing Sheet

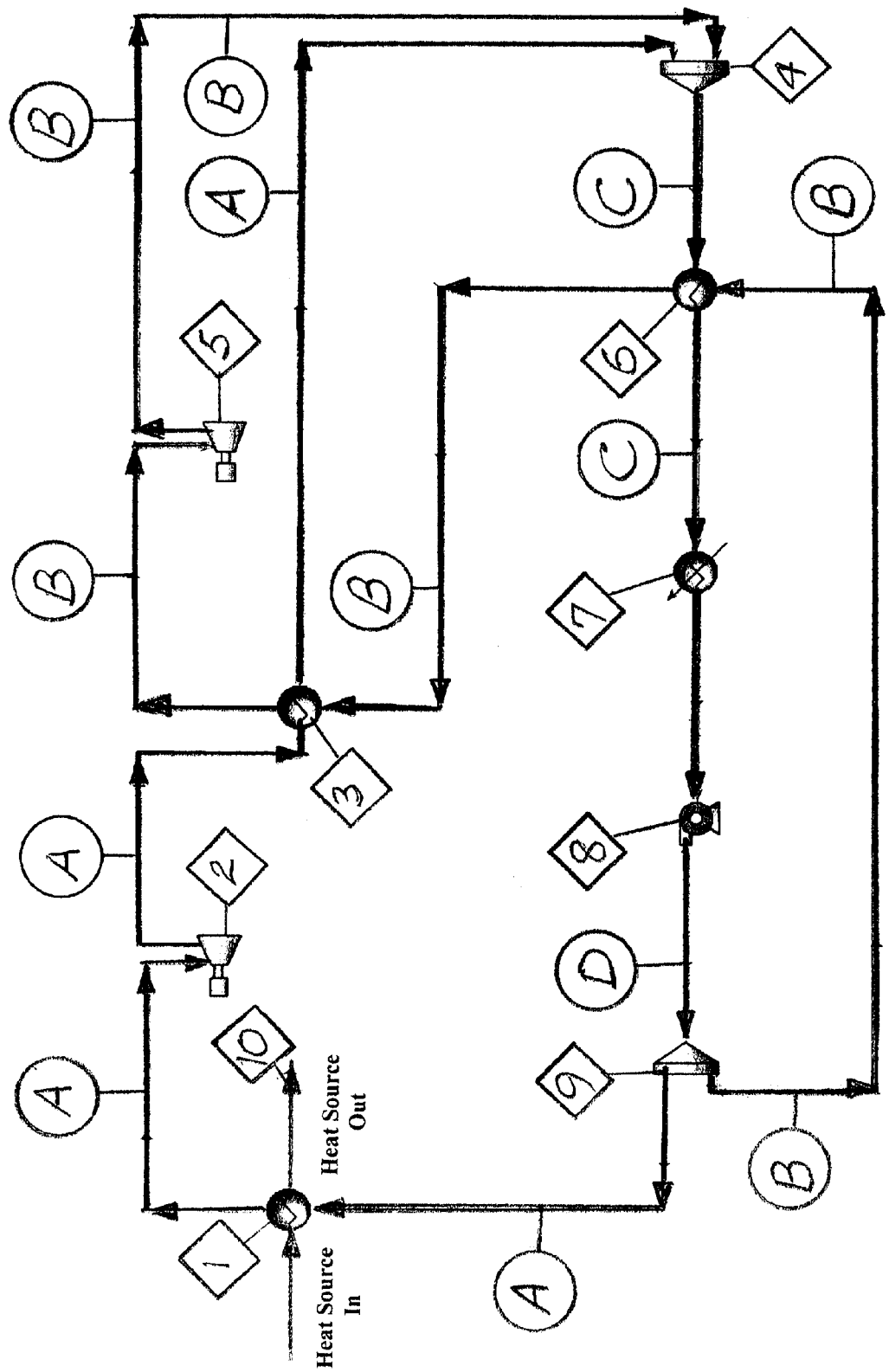
Cascading Closed Loop Cycle (CCLC)

US 6,857,268 B2

CASCADING CLOSED LOOP CYCLE (CCLC)

BACKGROUND OF THE INVENTION

Converting heat to useful power or developing power in a more efficient manner from the combustion of fossil fuels is of paramount importance as fuel costs rise and energy sources are depleted. In addition, the negative impact on the environment of pollution generated from the combustion of fossil fuels dictates that power plants be designed to reduce the pollutants generated per unit of energy produced. These factors create a need to recover energy from waste heat generated by power plants; waste heat from various manufacturing processes; and thermal energy from renewable energy sources.

Various methods and processes are used to improve the efficiency of converting fossil fuels to usable power such as gas turbine combined cycle plants; cogeneration plants; waste heat recovery systems; and generation of power using an expansion turbine to reduce pressure in high pressure hydrocarbon streams in petrochemical plants or on gas pipelines.

It can be shown thermodynamically that converting thermal energy to mechanical energy is best performed with the Organic Rankine Cycle (ORC). The present invention is an ORC designed to utilize any heat source with sufficient temperature to vaporize propane, or an equivalent light hydrocarbon medium, and efficiently convert thermal energy to mechanical or electrical energy. Methods are known in the prior art that utilize an ORC cycle to generate useful power. These prior art systems use a conventional ORC medium such as normal pentane, iso-pentane, toluene, fluorinated hydrocarbons and other refrigerants, with pressure and temperature limitations, which reduce their effectiveness and efficiency thereby restricting power output. The ORC medium used in the present invention is propane, or an equivalent light hydrocarbon medium and does not have these limitations.

Prior art ORC systems which utilize refrigerants or toluene are restricted to operation with heated water since the ORC medium can not absorb energy at elevated temperatures. Other prior art ORC methods require an ORC medium with a vapor pressure near atmospheric pressure to be efficient. There are other prior art methods used where high pressure light hydrocarbon gases require depressurization as part of the overall process and rather then reduce the pressure in a valve where no energy is recovered, an expansion turbine is used as the means to throttle the pressure and power is produced by connecting the expansion turbine to a generator, pump or compressor. These systems are open loop systems and are dependant on the pressure level of the process design. The present invention can be used irrespective of the pressure level of the heat source as long as the temperature of the heat source is high enough to vaporize propane, or an equivalent ORC medium, in a closed loop hermetic cycle.

Other prior art systems are restricted to a specific power output range while others require spraying a fluid ORC medium into the heat exchanger for efficient operation. The present invention does not have these limitations or restrictions.

Cogeneration and combined cycle systems convert waste heat into useful power from gas turbine exhaust or other fossil fuel heat sources, including low grade heating value fuel sources, by using the heat of combustion to generate steam. Temperatures of the heat source must be high enough to vaporized steam in a heat exchanger (boiler). The resulting steam is expanded in a steam turbine to produce power. Steam boilers are generally limited to recovering the thermal energy associated with the differential temperature between the initial temperature of the heat source and 500° F. or higher since this is the temperature required to achieve efficient thermal energy transfer to produce steam. Further, the available heat for transferring energy to the steam is limited by the temperature differential restrictions imposed by the vapor pressure versus temperature characteristics of steam. Generally, the 500° F. discharge temperature of the heat source exiting the boiler can be used to heat the boiler feed water using a separate heat exchanger. The recoverable heat using a boiler feed water heat exchanger is restricted to the temperature differential between the 500° F. discharge temperature of the exhaust stream and 300° F. or above due to the vapor pressure and temperature characteristics of water. Some cogeneration and combined cycle systems envision an ORC method in combination with the steam turbine system to capture additional power output from the low temperature exhaust stream of the boiler. The ORC methods integrated with these steam systems are restricted to lower temperature heat streams since the ORC mediums used can not sustain high temperatures due to their respective auto ignition temperatures and vapor pressure versus temperature characteristics. The present invention does not have these limitations and can recover the available heat down to temperatures slightly above ambient temperatures. This characteristic of the CCLC allows replacement of the steam system or conventional low temperature ORC system or both with a single CCLC as described in the present invention. The present invention offers increased recovery of thermal energy into useful output; lower cost and lower discharge temperatures of the waste heat effluents, which is less harmful to the environment then prior art systems.

The present invention is a closed loop, hermetically sealed system and emission free since it does not depend on a separate fuel source or operation in conjunction with another power generation system to produce useful energy. A key component of the CCLC system is the tertiary indirect heat exchanger that allows extracting more thermal energy from the heat source then prior art systems. Transferring residual heat to the propane in the tertiary indirect heat exchanger allows converting this thermal energy to useful output in the secondary expansion turbine whereas prior art systems discarded this available heat to the environment during the condensing process. The tertiary indirect heat exchanger uses the latent heat of vaporization available in the propane streams to vaporize the secondary propane stream. This is achieved by controlling the discharge pressure of the expansion turbines to a level that keeps the propane streams exiting the tertiary indirect heat exchanger in a vapor state. Optimum efficiency is achieved for the CCLC system when the temperature level of the propane stream exiting the tertiary indirect heat exchanger is slightly above the pinch point temperature of the condenser. The pinch point temperature is generally defined as 15° F. above the temperature of the cooling medium (usually water or ambient air) entering the condenser. The ability of the CCLC to extract thermal energy down to these pinch point temperatures is due to propane's vapor pressure versus temperature characteristics that cause it to remain a vapor at temperatures ranging from −60° F. to 120° F. as long as the pressure is kept above the vapor pressure for a given temperature. At colder climatic conditions, or as ambient temperatures cool during the day, the pressure required to maintain the propane in a vapor state is reduced which allows increasing the pressure differential across the expansion turbine an equivalent amount thereby increasing the power recovery by 20% to 50% or more. This is not the case for the steam systems or ORC methods described in the prior art that do not use a tertiary indirect heat exchanger for this purpose. An additional benefit of using the tertiary indirect heat exchanger of the CCLC is lower discharge temperatures of the cooling effluents used in the condenser to liquefy the propane, which is less harmful to the environment.

Using the CCLC system according to the present invention allows operation over a wide range of ambient temperatures resulting in increased recovery of energy at reduced cost with an overall reduction in emissions per unit of output.

BRIEF DESCRIPTION OF THE INVENTION

A Cascading Closed Loop Cycle (CCLC) system is provided for developing power in a cascading expansion turbine arrangement using propane, or an equivalent light hydrocarbon medium, and any available heat source with a temperature high enough to vaporize propane. The present invention consists of a primary indirect heat exchanger; a primary expansion turbine; a secondary indirect heat exchanger; a secondary expansion turbine; a tertiary indirect heat exchanger; a propane stream mixer; a condensing unit; a propane liquid pump; and a propane stream separator. A primary stream of propane is vaporized in the primary indirect heat exchanger by utilizing thermal energy derived from the heat source, and then expanded in the primary expansion turbine to produce electrical or mechanical energy. The primary stream of propane vapor leaving the primary expansion turbine is supplied to the secondary indirect heat exchanger where residual heat is used to superheat a secondary stream of propane. The secondary stream of vaporized propane is expanded in a secondary expansion turbine to produce electrical or mechanical energy. The secondary stream of propane, from the exhaust of the secondary expansion turbine, is combined with the primary stream of propane exiting the secondary indirect heat exchanger in a stream mixer. The mixed propane stream is delivered to the tertiary indirect heat exchanger where residual heat in the mixed stream is transferred to the secondary stream of propane in the form of additional thermal energy prior to entering the secondary indirect heat exchanger. After exiting the tertiary indirect heat exchanger, the combined streams enter a condenser where the propane is condensed to a liquid; such cooling or condensing systems are well known in the art. The combined streams of liquid propane are pressurized with a pump and separated into a primary and secondary stream in the stream separator and the closed loop hermetic cycle is repeated with the primary stream directed to the primary indirect heat exchanger and the secondary stream directed to the tertiary indirect heat exchanger. The first and second expansion turbines can be connected in series or in parallel to multiple power generation devices such as a generator, pump or compressor using any speed changing means; such equipment arrangements are well known in the art.

DETAILED DESCRIPTION OF THE INVENTION

This invention relates to a method for efficiently converting waste heat into usable power using a Cascading Closed Loop Cycle (CCLC) hermitically sealed process. The CCLC uses a primary fluid stream A, such as propane, which is vaporized in the primary indirect heat exchanger 1, expanded in a primary expansion turbine 2, and discharged to a secondary indirect heat exchanger 3 where it is introduced to a stream mixer 4. The secondary indirect heat exchanger 3 superheats a secondary stream of propane B by using the vaporized propane exiting the primary expansion turbine 2. The secondary stream of propane B is directed to a secondary expansion turbine 5 for generating useful power. The secondary stream of propane B, exiting the secondary expansion turbine 5, is combined with the primary stream of propane B in the stream mixer 4. After mixing in the stream mixer 4 the combined propane stream C is directed to a tertiary indirect heat exchanger 6 where heat in the propane stream C is transferred to the secondary propane stream B in the tertiary heat exchanger 6. After exiting the tertiary indirect heat exchanger 6, the combined stream C is directed to a condenser 7 where the propane stream C is condensed to a liquid and directed to a high pressure pump 8. The liquid propane stream D, discharged from the high pressure pump 8, is directed to a stream separator 9 where it is separated into the primary propane stream A and the secondary propane stream B where the cascading expansion turbine closed loop hermetically sealed cycle repeats the vaporization, expansion, liquefaction and pressurization process. The discharge temperature of the waste heat effluent from the primary heat exchange 1 is directed to atmosphere through the exhaust stack 10.

The primary expansion turbine 2 and secondary expansion turbine 5 can be connected in series or parallel to a power generation device using any speed changing means to produce mechanical or electrical power:

It is obvious that the present invention is not restricted to the embodiments presented above. The present invention can be modified within the basic idea to include additional heat exchangers, condensers, pumps or expansion turbines. Alternate arrangements and configurations can also be used to connect to and drive a pump, compressor or electrical generator.

We claim:

1. A method for converting heat to useful energy based on a Cascading Closed Loop Cycle (CCLC), said method comprising the following steps:

A) supplying a primary liquid stream of propane to a primary indirect heat exchanger to vaporize said propane by utilizing the thermal energy derived from a heat source;

B) expanding the primary stream of vaporized propane in a primary expansion turbine to produce useful energy;

C) leading the primary vaporized propane stream leaving the primary expansion turbine to a secondary indirect heat exchanger;

D) superheating a secondary stream of vaporized propane in the secondary indirect heat exchanger;

E) expanding the secondary stream of superheated propane in a secondary expansion turbine to produce useful energy;

F) leading the primary stream of vaporized propane exiting the secondary indirect heat exchanger to a stream mixer;

G) leading the secondary stream of vaporized propane exiting the secondary expansion turbine to the stream mixer;

H) combining the primary and secondary streams of vaporized propane in the stream mixer;

I) leading the combined stream of vaporized propane to a tertiary indirect heat exchanger for vaporizing the secondary stream of liquid propane;

J) leading the combined stream of vaporized propane to a condenser for cooling the same to a liquid;

K) leading the combined stream of liquid propane exiting the condenser to a pump;

L) pressurizing the combined stream of liquid propane in the pump;

M) separating the pressurized combined stream of liquid propane from the discharge of the pump into a primary and secondary propane stream in the stream separator;

N) leading the primary stream of pressurized liquid propane to Step A for vaporizing same; and O) leading the secondary stream of pressurized liquid propane to Step I for vaporizing same.

2. A method according to claim 1, wherein an ORC medium is propylene.

3. A method according to claim 1, wherein an ORC medium is light hydrocarbons.

4. A method according to claim 1, wherein an ORC medium is a mixture of light hydrocarbons.

5. A method according to claim 1, wherein the discharge pressure of the expansion turbines is controlled to maintain the discharge pressure of the tertiary indirect heat exchanger above the vapor pressure of the ORC medium.

* * * * *